(12) United States Patent
Rice

(10) Patent No.: US 7,470,883 B1
(45) Date of Patent: Dec. 30, 2008

(54) NON-INVASIVE INITIATION DETONATION SENSOR

(75) Inventor: Brett A. Rice, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 36 days.

(21) Appl. No.: 11/543,273

(22) Filed: Oct. 2, 2006

(51) Int. Cl.
*G01J 1/42* (2006.01)
(52) U.S. Cl. .................................. 250/208.2
(58) Field of Classification Search ............. 250/208.2
See application file for complete search history.

(56) References Cited

U.S. PATENT DOCUMENTS 4,199,682 A * 4/1980 Spector et al. ......... 250/339.02
4,718,497 A * 1/1988 Moore et al. ................ 169/61
6,034,365 A * 3/2000 Levin ...................... 250/206.2

* cited by examiner

*Primary Examiner*—Georgia Y Epps
*Assistant Examiner*—Kevin Wyatt
(74) *Attorney, Agent, or Firm*—Christopher A. Monsey

(57) ABSTRACT

The present invention is directed to an apparatus and method of use for detecting the explosive detonation. The apparatus has a plurality of sensors consecutively arranged and spaced apart wherein each pair of consecutive light sensors defines a sensor pair. The sensors are sequentially activated by light produced by the detonation of explosive detonation and are inactivated by the absence of light. The sensors provide data that represents the amount of time that elapses between activation of a first light sensor in a sensor pair and activation of a second light sensor in the sensor pair and the length of time in which each sensor is activated. The data is processed to determine detonation velocity values and chemical reaction time values associated with material detonation and to provide an output signal that indicates whether the determined detonation velocity values and chemical reaction time values are valid.

18 Claims, 4 Drawing Sheets

NON-INVASIVE INITIATION DETONATION SENSOR

STATEMENT OF GOVERNMENT INTEREST

The invention described herein may be manufactured and used by or for the Government of the United States of America for Governmental purposes without payment of any royalties thereon or therefore.

BACKGROUND OF THE INVENTION (1) Field of the Invention

The present invention relates to an apparatus and method of use determining the detonation velocity and chemical reaction time associated with the detonation of explosive material.

(2) Description of the Prior Art

Electronic control systems are becoming very valuable tools in the field of explosives. The performance of many of these electronic control systems would be enhanced if such systems could reliably and accurately detect initiation or detonation of a conventional explosive. Having such information beforehand would enable the electronic control systems to adjust or re-program. Furthermore, it would be useful for an electronic control system to determine the detonation velocity and chemical reaction time associated with the detonation of an explosive.

Prior art systems used to detect the detonation of explosive materials use electro-mechanical interfaces that are prone to reliability problems due to moving parts and complex mechanical components. Such prior art systems also lack the timing accuracy necessary to distinguish between different types of explosives.

As such, a need exists for an apparatus and method of use that reliably detects the initiation and/or detonation of an explosive.

SUMMARY OF THE INVENTION

Therefore, it is a general purpose and primary object of the present invention to provide an apparatus and method of use that accurately and reliably detects the initiation and/or detonation of a conventional explosive.

It is a further object of the present invention to provide an apparatus and method of use for detecting the detonation velocity and chemical reaction time associated with the detonation of explosive material.

It is a still further object of the present invention to provide an apparatus and method of use for accurately and reliably detecting the initiation and/or detonation of a conventional explosive at a reasonable cost.

In accordance with the objects of the present invention, there is provided an apparatus to detect the detonation of an explosive comprising a plurality of light sensors consecutively arranged and spaced apart by a predetermined distance wherein each pair of consecutive light sensors defines a light sensor pair. The light sensors are sequentially activated by light produced by the detonation of explosive material and are inactivated by the absence of light.

The light sensors provide sensor data that represents the amount of time that elapses between activation of a first light sensor in a sensor pair and activation of a second light sensor in the sensor pair and the length of time in which each light sensor is activated. Such sensor data ensures a unique and predictable pattern for a known explosive.

The apparatus further comprises a processor to process the sensor data to determine detonation velocity values and chemical reaction time values associated with the detonation of explosive material and to indicate whether the determined detonation velocity values and chemical reaction time values are valid.

In accordance with a related aspect of the invention, a method of use is disclosed for detecting the detonation of explosives comprising the steps of arranging a plurality of light sensors in a consecutive orientation wherein the light sensors are spaced apart by a predetermined distance and each pair of consecutive light sensors defines a light sensor pair. The light sensors are sequentially activated by light produced by the detonation of explosive material and are inactivated by the absence of light. The light sensors provide sensor data that is defined by the amount of time that elapses between activation of a first light sensor in a sensor pair and activation of a second light sensor in the sensor pair and the length of time in which each light sensor is activated.

The method further comprises the steps of processing the sensor data to determine detonation velocity values and chemical reaction time values associated with an explosion, and indicating whether the determined detonation velocity values and chemical reaction time values are valid.

BRIEF DESCRIPTION OF THE DRAWINGS

A more complete understanding of the invention and many of the attendant advantages thereto will be appreciated as the same, becomes better understood by reference to the following detailed description when considered in conjunction with the accompanying drawings in which.

DESCRIPTION OF THE PREFERRED EMBODIMENT

Figure 1:
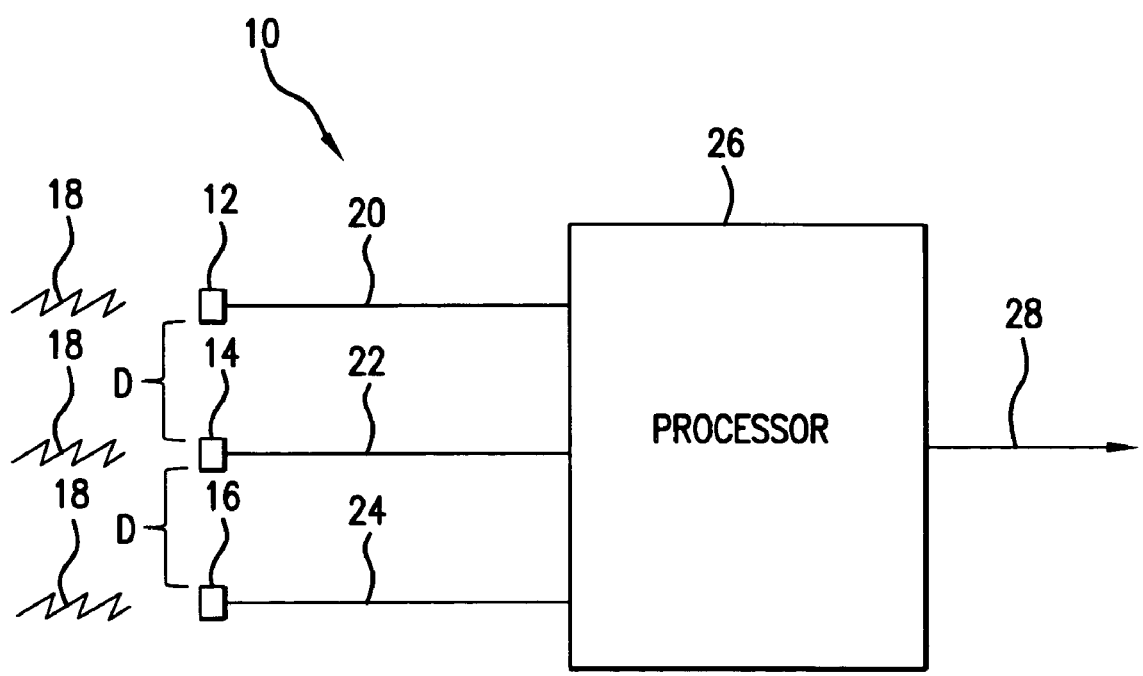
FIG. 1 is a block diagram of the apparatus for detecting initiation and detonation of an explosive in accordance with one embodiment of the present invention.

Referring now to FIG. 1, there is shown an apparatus 10 of the present invention which detects the initiation and/or detonation of explosive material. The apparatus 10 generally comprises a plurality of light sensors 12, 14 and 16 consecutively arranged and spaced apart by a predetermined distance "D". In one embodiment, the predetermined distance D is about one inch; however, the distance D can be less than or greater than one inch.

Although the three light sensors 12, 14 and 16 are shown, it is to be understood that there can be more than three light sensors. Each pair of consecutive light sensors defines a light sensor pair. For example, the light sensors 12 and 14 form one light sensor pair, and the light sensors 14 and 16 form a second light sensor pair. Each light sensor 12, 14 and 16 is activated by light waves 18 associated with an initiation and/or detonation of explosive material, and is inactivated by the absence of light. In one embodiment, each light sensor 12, 14 and 16 comprises a PIN photodiode.

The light sensors 12, 14 and 16 provide light sensor data signals 20, 22 and 24, respectively, that represent the amount of time that elapses between activation of a first light sensor in a light sensor pair and activation of a second light sensor in the light sensor pair, and the length of time in which each light sensor is activated. For example, the amount of time between activation of the light sensor 12 and activation of the light sensor 14 is $\Delta T_1$. Similarly, the amount of time between activation of the light sensor 14 and activation of the light sensor 16 is $\Delta T_2$. The length of time in which a light sensor remains activated is referred to as the "high time". This high time is related to the chemical reaction time. The sensor data provided by the light sensors 12, 14 and 16 serves to ensure a unique and predictable pattern for a known explosive.

The apparatus 10 further comprises processor 26 to process the light sensor data signals 20, 22 and 24 in order to determine detonation velocity values and chemical reaction time values associated with the initiation and/or detonation of an explosive material and to provide an output signal 28 that indicates whether the determined detonation velocity values and chemical reaction time values are valid.

In a preferred embodiment, processor 26 comprises a microprocessor; both the processor and microprocessor are of a type known to those skilled in the art. The processor 26 is programmed to implement an algorithm that determines a detonation velocity value by dividing the predetermined distance D by the amount of time that elapses between activation of a first light sensor in a light sensor pair and activation of a second light sensor in the light sensor pair. Thus, the processor 26 determines one detonation velocity value by calculating $D/\Delta T_1$. The processor 26 determines a second detonation velocity value by calculating $D/\Delta T_2$. Since there are three light sensors 12, 14 and 16, there are two detonation velocity values. If four light sensors were used, there would be three detonation velocity values.

Figure 2:
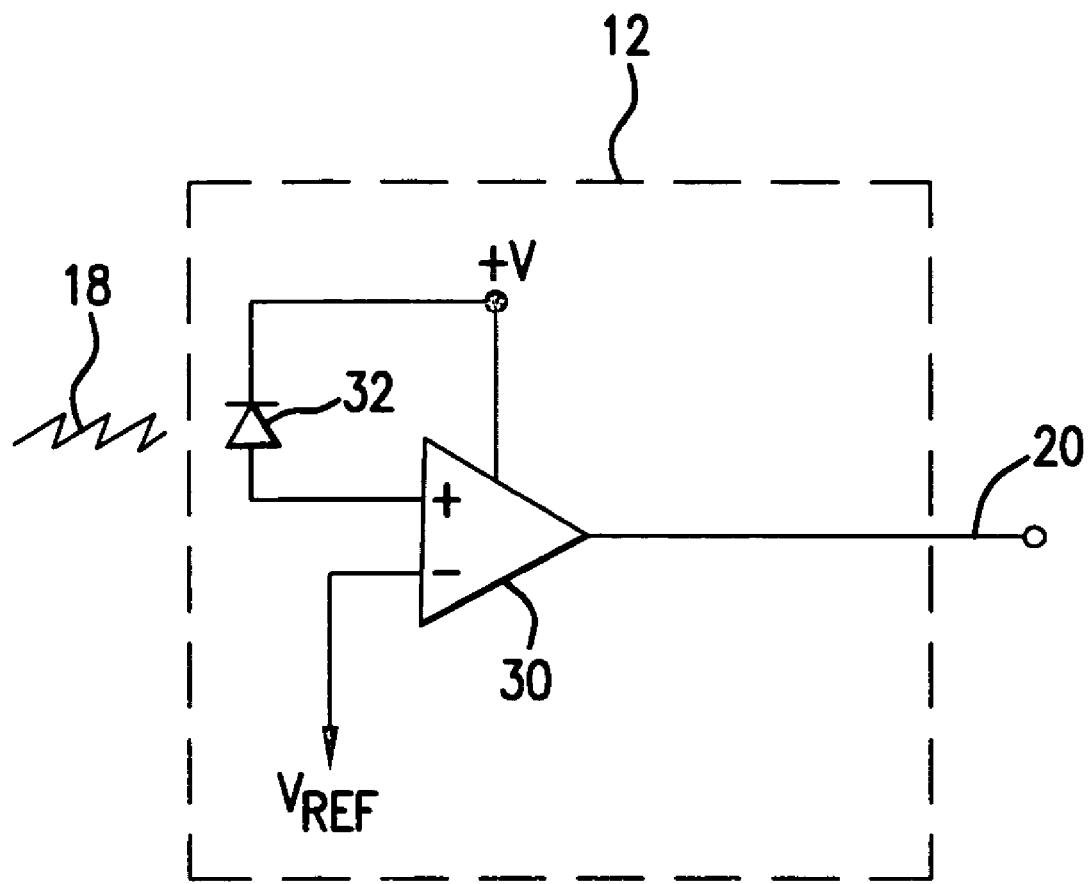
FIG. 2 is a schematic showing one embodiment of a light sensor used in the apparatus shown in FIG. 1.

Each light sensor 12, 14 and 16 may be configured by a variety of electronic circuits known to those skilled in the art. One suitable electronic circuit is shown in FIG. 2. Only the light sensor 12 is shown in the figure. The light sensor 12 includes a comparator 30, PIN photodiode 32 and reference voltage $V_{REF}$. The anode of the photodiode 32 and the non-inverting input of the comparator 30 are connected to power supply voltage +V. The inverting input of the comparator 30 is connected to the reference voltage $V_{REF}$. When the photodiode 32 detects the light wave 18, the photodiode 32 becomes conductive and connects the power supply voltage +V to the non-inverting input of the comparator 30. In response, the comparator 30 outputs signal 20 that has a logic "high" voltage level, e.g. 3.5 volts.

When the light wave 18 is not present, the photodiode 32 becomes an open circuit. In response, the comparator 30 outputs the signal 20 that has a logic "low" voltage level, e.g. 0.5 volts. It is to be understood that the circuit shown in FIG. 2 is just an example and that other circuits are possible.

Referring again to FIG. 1, the processor 26 determines a chemical reaction time value for each light sensor 12, 14 and 16. Specifically, the processor 26 determines the chemical reaction time value by measuring the length of time in which a light sensor remains activated. The processor 26 also determines if each determined detonation velocity value and each determined chemical reaction time value are within predetermined ranges of values.

The processor 26 outputs the signal 28 which exhibits a first state that indicates all determined detonation values and chemical reaction time values are within the predetermined ranges of values and are thus valid, or a second state that indicates that at least one of determined detonation values and/or at least one of the determined chemical reaction times is not within the predetermined ranges of values. Table I lists examples of predetermined ranges of values for detonation velocity values and chemical reaction times.

TABLE I

| Measured Value | Minimum Time | Maximum Time |
| --- | --- | --- |
| $\Delta T_1$ | 5 μs | 17 μs |
| $\Delta T_2$ | 5 μs | 17 μs |
| Chemical Reaction Time | 157 μs | 1925 μs |

Figure 3:
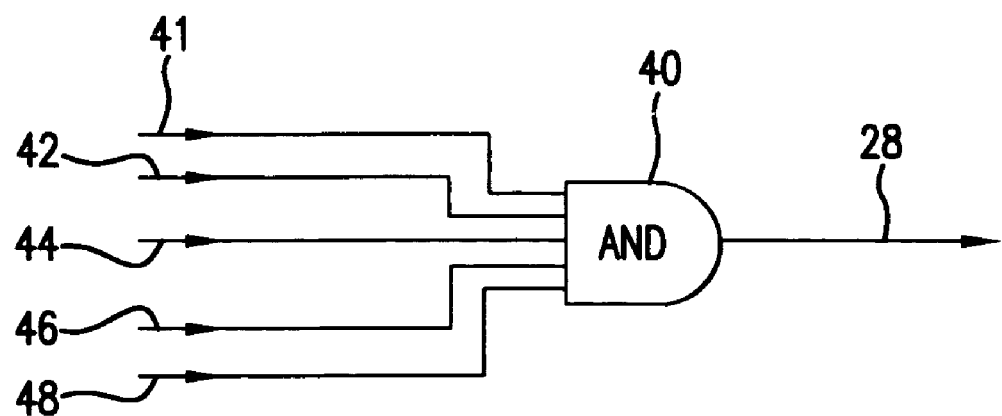
FIG. 3 is a schematic of a logic function implemented by the processor shown in FIG. 1.

Referring now to FIG. 3, the processor 26 is programmed with software that implements an AND logic function that results in generation of the signal 28. This AND logic function is represented by AND logic gate 40 which is provided to facilitate understanding of the operation of the processor 26.

After the processor 26 determines whether or not the determined detonation velocity values are valid, the processor 26 generates status signals 41 and 42. Each status signal 41 and 42 has a first logic state to indicate whether the determined detonation velocity value is valid, and a second logic state to indicate whether the determined detonation velocity value is invalid.

Similarly, after the processor 26 determines whether or not the determined chemical reaction times are valid, the processor generates status signals 44, 46 and 48. Each status signal 44, 46 and 48 has a first logic state to indicate the determined chemical reaction time value is valid, and a second logic state to indicate the determined chemical reaction time value is invalid.

The AND logic function, represented by the AND logic gate 40, is performed on all status signals 41, 42, 44, 46 and 48. When all of the status signals 41, 42, 44, 46, and 48 have the first logic state, the AND logic function provides signal 28 with the first logic state which indicates all determined detonation velocity values and chemical reaction time values are valid. If one or more of the status signals 41, 42, 44, 46, and 48 have the second logic state, then the AND logic function provides the signal 28 with the second logic state which indicates invalid detonation velocity values and/or invalid chemical reaction time values.

The signal 28 is then routed to other external electronic systems, components or equipment (not shown) that require updated and accurate information as to whether the determined detonation velocity values and chemical reaction time values are valid or invalid.

A significant feature of the present invention is that the apparatus 10 can recognize detonation from either direction. In order for the apparatus 10 to recognize detonation from either direction, the light sensors 12, 14 and 16 must be activated in a sequential order. Thus, the apparatus 10 detects an explosion in a first direction if the light sensors are sequentially activated in the following sequence: SENSOR 12 . . . SENSOR 14 . . . SENSOR 16. Conversely, if the apparatus 10 detects an explosion in a second, opposite direction, the light sensors are sequentially activated in the following sequence: SENSOR 16 . . . SENSOR 14 . . . SENSOR 12. If any of the light sensors are activated out of order, then the processor 26 outputs the signal 28 having the second logic state that indicates the determined detonation velocities and chemical reaction times are invalid.

In a preferred embodiment, the apparatus 10 is configured so that the processor 26 outputs the signal 28 with the second logic state to indicate invalid detonation velocity values and chemical reaction times if any glitches occur on the inputs of the light sensors 12, 14 and 16 during a predetermined time window after the last light sensor in the sequence becomes inactivated. In one embodiment, this predetermined time window is defined by the time period between 2 milliseconds and 49 milliseconds after the last light sensor becomes inactivated.

Figure 4:
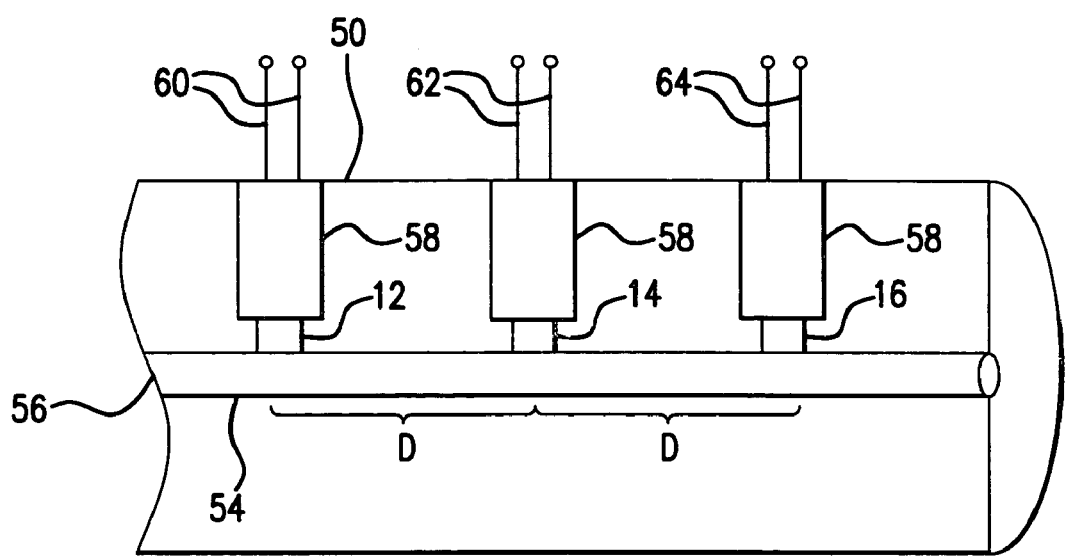
FIG. 4 is a diagram showing the apparatus of FIG. 1 used with a NONEL line.

In one application, the apparatus 10 is used in combination with a NONEL (Non-Electric) noiseless trunk line. A NONEL line generally comprises a hollow plastic tube having an inside coated with a minute amount of explosive. Such a configuration is shown in FIG. 4. The figure depicts a portion of a sensor shell/housing 50 in which a NONEL line may be inserted.

The shell 50 surrounds inner a channel 54. Entry opening 56 is in communication with the channel 54 and is provided for insertion of the NONEL line (not shown). In this embodiment, the light sensors 12, 14 and 16 are configured as PIN photodiodes and are positioned in retaining members 58 that are attached to the shell 50. Leads 60, 62 and 64 of the light sensors 12, 14 and 16, respectively, are connected to other circuitry in the apparatus 10. The light sensors 12, 14 and 16 are adjacent to the channel 54 such that the light-receiving portion of each PIN photodiode confronts the channel. The light sensors 12, 14 and 16 are spaced apart by distance D which, in this embodiment, is one inch.

In one embodiment, the shell 50 is fabricated from opaque plastic. When an explosion occurs in the NONEL line, the explosion is contained within the channel 54 but travels down the channel producing light waves. Thus, if the explosion was traveling from left to right in FIG. 4, the light sensor 12 is the first light sensor to be activated and the light sensor 14 is the next light sensor to be activated. The light sensor 16 is activated last. The operation of the light sensors 12, 14 and 16 is nearly independent of the length of the NONEL line provided that there is sufficient length of the NONEL line to provide a full speed detonation. In this case, the length is approximately 12-18 inches.

Thus, the present invention provides an apparatus and method to accurately and reliably detect detonation of an explosion and to provide confirmation of the explosion to external electronic control systems thereby allowing such electronic control systems to react to the explosion. A significant feature of the invention is that the light sensors provide sensor data that represents the amount of time that elapses between activation of a first light sensor in a sensor pair and activation of a second light sensor in the sensor pair, and the length of time in which each light sensor is activated. This sensor data serves to ensure a unique and predictable pattern for a known explosive.

Apparatus 10 of the present invention may be implemented with commercially available electronic components and may also be configured on one monolithic chip. The present invention can be used in a wide variety of applications, e.g. anti-terrorism, military, law enforcement, etc.

It will be understood that many additional changes in the details, materials, steps and arrangement of parts, which have been herein described and illustrated in order to explain the nature of the invention, may be made by those skilled in the art within which the principle and scope of the invention as expressed in the appended claims.

What is claimed is:

1. An apparatus for detecting the detonation of explosive material, said apparatus comprising:
    a plurality of light sensors consecutively arranged and spaced apart by a predetermined distance wherein each pair of consecutive light sensors defines a light sensor pair, said light sensors capable of being sequentially activated by light produced by the detonation of explosive material and inactivated by the absence of light with said light sensors providing sensor data that represents an amount of time elapsed between activation of a first light sensor in said light sensor pair and activation of a second light sensor in said sensor pair and a length of time in which one or more of said light sensors are activated; and
    a processor for processing the sensor data to determine detonation velocity values and chemical reaction time values associated with the detonation of the explosive material and indicating whether the determined detonation velocity values and chemical reaction time values are a valid detonation indication of said explosive material, wherein said valid detonation indication is based on a plurality of determinations comprising a first and second determination, said first determination is a determination that detonation velocity values and chemical reaction time values are within a range of detonation velocity values and a range of chemical reaction time values associated with said explosive material which has detonated as designed, said second determination is based on a sensed match and/or no-match of a predetermined activation sequence of said light sensor pairs.

2. The apparatus according to claim 1, wherein said processor is programmed to determine the detonation velocity values by dividing the predetermined distance by an amount of time that elapses between activation of said first light sensor and activation of said second light sensor.

3. The apparatus according to claim 2, wherein said processor is further programmed to determine said chemical reaction time values by determining a length of time in which one or more of said light sensors are activated.

4. The apparatus according to claim 1, wherein said processor is further programmed to determine if the determined detonation velocity values and chemical reaction time values are within predetermined ranges of values.

5. The apparatus according to claim 4, wherein said processor provides an output signal having a first state that indicates determined detonation velocity values and chemical reaction time values are within the predetermined ranges of values and a second state that indicates that at least one of the determined detonation velocity values or at least one of the determined chemical reaction times are not within the predetermined ranges of values.

6. The apparatus according to claim 5, wherein said processor provides the output signal with the second state if said light sensors are not activated in a sequential order.

7. The apparatus according to claim 1, wherein said plurality of light sensors comprises three light sensors which form two light sensor pairs wherein one of said light sensors of the three light sensors is shared between two light sensor pairs.

8. The apparatus according to claim 1, wherein the predetermined distance between each light sensor of said plurality of light sensors is one inch.

9. The apparatus according to claim 1, wherein each light sensor of said plurality of light sensors comprises a photodiode.

10. The apparatus according to claim 1, wherein said processor comprises a microprocessor.

11. A method for detecting detonation of explosive material, said method comprising the steps of:
    arranging a plurality of light sensors in a consecutive orientation wherein the light sensors are spaced apart by a predetermined distance and each pair of consecutive light sensors defines a light sensor pair, the light sensors being sequentially activated by light produced by detonation of explosive material and inactivated by an absence of light, the light sensors capable of providing sensor data that is defined by an amount of time that elapses between activation of a first light sensor in a sensor pair and activation of a second light sensor in the sensor pair and a length of time in which each light sensor is activated;

processing the sensor data to determine detonation velocity values and chemical reaction time values associated with the detonation; and indicating whether the determined detonation velocity values and chemical reaction time values are a valid detonation indication of said explosive material, wherein said valid detonation indication is based on a plurality of determinations comprising a first and second determination, said first determination is a determination that detonation velocity values and chemical reaction time values are within a range of detonation velocity values and a range of chemical reaction time values associated with said explosive material which has detonated as designed, said second determination is based on a sensed match and/or no-match of a predetermined activation sequence of said light sensor pairs.

12. The method according to claim 11, wherein said processing step comprises determining a detonation velocity value by dividing the predetermined distance by the amount of time that elapses between activation of the first light sensor and activation of the second light sensor.

13. The method according to claim 11, wherein said processing step further comprises determining a chemical reaction time value by determining the length of time in which a light sensor of the plurality of light sensors is activated.

14. The method according to claim 11, wherein said processing step further comprises the step of determining if the determined detonation velocity values and chemical reaction time values are within a predetermined range of values.

15. The method according to claim 14, wherein said step of indicating comprises generating an output signal with a first state that indicates all determined detonation velocity values and chemical reaction time values are within the predetermined ranges of values and a second state that indicates that at least one of the determined detonation values or at least one of the determined chemical reaction times is not within the predetermined range of values.

16. The method according to claim 15, further comprising the step of generating the output signal with the second state if the light sensors are not activated in a sequential order.

17. A method as in claim 11, further comprising providing a light control structure adapted to block said light sensors from receiving light from all sources except said explosive material.

18. An apparatus as in claim 1, further comprising a light control structure adapted to block said light sensors from receiving light from all sources except said explosive material.

* * * * *